US008102130B2

(12) United States Patent
Seib

(10) Patent No.: US 8,102,130 B2
(45) Date of Patent: Jan. 24, 2012

(54) ELECTRIC POWER DISTRIBUTION SYSTEM USING LOW VOLTAGE CONTROL SIGNALS

(75) Inventor: James N. Seib, Bedford, IN (US); Kevin Broc Seib, legal representative, Lafayette, IN (US)

(73) Assignee: Light-On, LLC, Bedford, IN (US)

( * ) Notice: Subject to any disclaimer, the term of this patent is extended or adjusted under 35 U.S.C. 154(b) by 887 days.

(21) Appl. No.: 12/143,190

(22) Filed: Jun. 20, 2008

(65) Prior Publication Data

US 2009/0315487 A1 Dec. 24, 2009

(51) Int. Cl.
*H05B 37/02* (2006.01)
*H02B 1/24* (2006.01)

(52) U.S. Cl. ......................... 315/361; 315/362; 307/112

(58) Field of Classification Search .................... 315/76, 315/84, 86, 93, 209 R, 291, 307, 361, 362; 307/112, 114, 115, 252 B
See application file for complete search history.

(56) References Cited

U.S. PATENT DOCUMENTS

| | | | | |
|---|---|---|---|---|
| 4,011,482 | A | 3/1977 | Seib | |
| 4,090,107 | A | 5/1978 | Seib | |
| 4,438,472 | A | 3/1984 | Woodworth | |
| 4,855,612 | A | 8/1989 | Koga et al. | |
| 4,885,654 | A | 12/1989 | Budyko et al. | |
| 4,956,562 | A * | 9/1990 | Benedict et al. | 307/10.8 |
| 5,164,609 | A * | 11/1992 | Poppe et al. | 307/147 |
| 5,283,706 | A | 2/1994 | Lillemo et al. | |
| 5,633,540 | A | 5/1997 | Moan | |
| 7,482,713 | B2 * | 1/2009 | McDonough | 307/134 |

* cited by examiner

*Primary Examiner* — Jacob Y Choi
*Assistant Examiner* — Jimmy Vu
(74) *Attorney, Agent, or Firm* — Woodard, Emhardt, Moriarty, McNett & Henry LLP

(57) ABSTRACT

An electrical power distribution system for efficiently installing electrical lights, devices, and power outlets to selectively energize or de-energize an electrical load in a building or structure. The electrical power distribution system comprises a control module installed in a building comprising the controlled output that is selectively energized by controlling a latching relay connected to an AC supply source and a load to be energized. Some embodiments further comprise an electronic switch in parallel with a relay. In addition, other embodiments include an electronic switch in parallel with a relay controlled by the same control signal to energize a load, where the electronic switch is energized before the contacts of the relay close and the electronic switch is de-energized after the contacts of the relay open. In an exemplary embodiment the load may be controlled and its ON/OFF status may be known at a distance of at least one mile with a pair of wires, AWG #24 or smaller diameter.

20 Claims, 5 Drawing Sheets

ELECTRIC POWER DISTRIBUTION SYSTEM USING LOW VOLTAGE CONTROL SIGNALS

BACKGROUND OF THE INVENTION

The present invention relates in general to electrical power distribution in structures.

The inventor's previous U.S. Pat. No. 4,011,482 discloses a circuit suitable for controlling lighting in a building from multiple points. An alternating current to a light bulb or other electrical load is controlled by a triac, which in turn is controlled by the output of a series of exclusive OR gates (Ex-OR gates). The output of each Ex-OR gate is connected to the input of an adjacent Ex-OR gate except that the output of the last Ex-OR gate of the series is connected to control the input to the triac. Switches connecting to the remaining inputs of each of the Ex-OR gates can independently determine energization or de-energization of the light bulbs or other electrical load.

Although the inventor's previous invention allowed for some improved efficiency of installation, there were several practical limitations. A first limitation was that the triac alone design disadvantageously required a heat sink because of power dissipated in the triac. In addition, the problem of power dissipation and potential thermal breakdown was compounded by environmental factors including limited air circulation when installed in a ceiling or wall. This was particularly problematic in a lighting control application since power dissipated by the load would tend to create additional heating. In addition, the inventor's previous invention did not disclose load fuse protection at the control unit. Nor did the inventor's previous invention provide thermal fuse protection of the control circuitry to improve safety.

The limitations of the inventor's previous invention indicate a need for an improved thermal design, and an improvement in energy efficiency. This includes limiting heat dissipation which is additionally important in the thermally challenging environments of in-wall and in-ceiling installations, particularly when containing thermal insulation.

SUMMARY OF THE INVENTION

One object of the present invention is to provide an improved means of installing and controlling electrical devices in a building. One advantage of some embodiments of the electrical power distribution system is the reduction in complexity of routing wiring within a structure, wherein line voltage AC power is not routed to the control switch interfaces. Yet other embodiments provide improved installation of the electrical power distribution system by using a small signal control interface, which allows for use of smaller gauge wire. Related objects and advantages of the various embodiments of the invention will be apparent from the following description.

One embodiment includes an electrical power distribution system for efficiently installing electrical lights, devices, and power outlets to selectively energize or de-energize an electrical load in a building or structure, such as in its wall, ceiling or floor. Typically this uses an AC supply source and an AC supply return and the electrical load operably coupled between a controlled output and the AC supply return. The electrical power distribution system includes, in part, a control module installed in the structure. The control module comprises a controlled output, a relay comprising a first relay contact operably coupled to the AC supply source, and a second relay contact associated with the first relay contact and operably coupled to the controlled output. In addition, an electronic switch is placed in parallel with the relay to operate momentarily while the relay is changing states, thus maximizing the life of the relay contacts. The electronic switch includes a first switch terminal operably coupled to the AC supply source and a second switch terminal operably coupled to the second relay contact and the controlled output.

In yet another embodiment, the control module further comprises "n" switch inputs each comprising an "on" state and an "off" state and a means of operably combining the "n" switch inputs. The control module combines the "n" switch inputs to provide control signals to the electronic switch and relay. In at least one embodiment, the control module's controlled output is energized or not energized by the AC supply source when the parity of "n" switch inputs are odd or even in number.

Some embodiments of the electrical power distribution system advantageously further comprise a switch having an "on" state and an "off" state and at least one connection operably coupling the switch to at least one of the "n" switch inputs of the control module. As a result, some embodiments advantageously use low power/low voltage signals to selectively control the control module. Thus, some embodiments provide a control connection using wire having a cross-sectional area of about AWG #16 wire.

Still other features of some embodiments of the invention include illuminated switches whose illumination reflects the status of the power to the load, and that use the same conductors for the switching as are used for powering the illumination of a load status indicating LED in the switch. One variant, provides intermittent flashing of the illuminated switch when the load is off, while persistent illumination is provided when the load is on. This feature can be applied to a plurality of switches when several different switches are configured to control a load.

DESCRIPTION OF THE PREFERRED EMBODIMENTS

Figure 1:
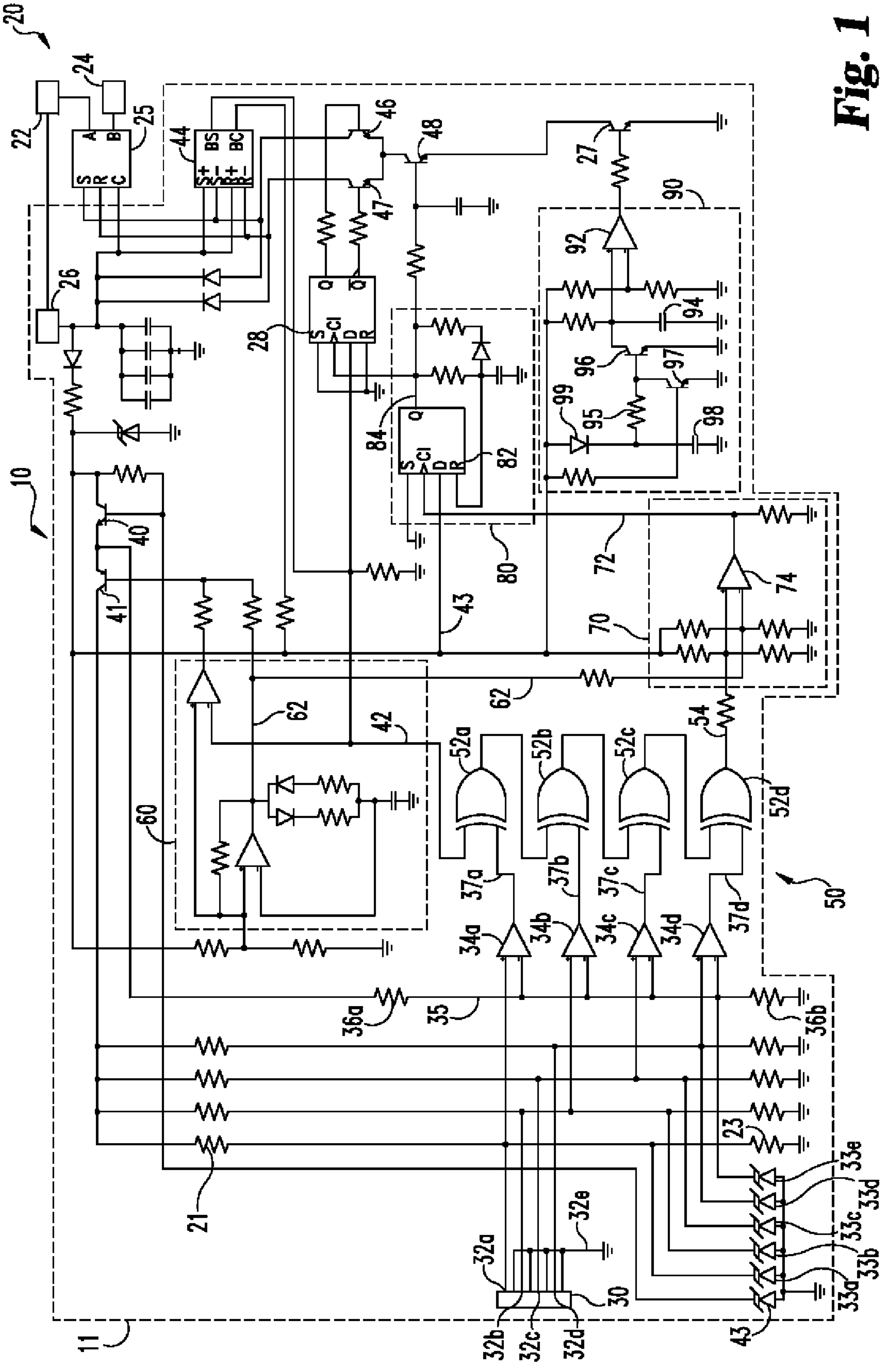
FIG. 1 is a schematic diagram of one embodiment of a low voltage AC control circuit designed by the inventors.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows one embodiment of an electrical load control circuit 10 suitable for selectively energizing or de-energizing an electrical load. The control circuit 10 includes two contact groups 20 and 30 for connection to external leads. Contact group 20 is suitable to receive a source of AC at AC input 22 which provides a 120 volt AC supply source at 60 Hertz. In one form, the source of AC is a breaker box or circuit breaker, connected to a main electrical box, electrical meter, and power line sequentially. Contact group 20 also contains a load connection 24 suitable for connection to an electrical load, such as a light bulb consuming 60 watts of power when voltage is applied through a completed circuit. It shall be appreciated that load connection 24 may also be a connection to an electrical load of another type such as a wall outlet, ceiling fan, one or more light fixtures, or otherwise. DC source 26 preferably connects to AC input 22 and converts this source of AC to a suitable voltage, such as +12 volts, for use by the control portion of circuit 10. The DC power provided by DC source 26 is selectively passed to contact group 30 by transistors 40 and 41. In the illustrative embodiment transistor 40 is an NPN transistor, such as a 2N3904, and transistor 41 is a PNP transistor, such as a 2N3906. As will be described herein, transistor 40 functions in combination with zener diode 43 to provide a stable DC reference voltage in the event of a declining supply voltage due to brown out or other electrical conditions while transistor 41 functions to intermittently provide DC switched on/off power based upon a clock signal which also provides polling and status illumination or constant DC power, when the load being controlled is in the "ON" state.

Contact group 30 contains a series of inputs 32*a*, 32*b*, 32*c*, and 32*d* (collectively inputs 32) suitable for low current electrical connection to a plurality of remote switches. Inputs 32 may also include a ground connection 32*e*, suitable for connection to the circuit ground, for use as a common ground among each switch connected to inputs 32. Alternatively, each input 32 may include two terminals, such as a line and ground. Inputs 32 may be a singular connector, a series of socket connectors suitable for receiving plugs, crimp-on or displacement terminals, or any other suitable type of electrical connector. In the preferred embodiment, the remote switches $SW_1$, $SW_2$, $SW_3$, and $SW_4$ (not illustrated) (collectively switches SW) are single pole switches having one pole connected to one of inputs 32 and the other pole connected to ground, such as ground connection 32*e*. An example of a switch suitable for use as switches SW will be described herein with reference to FIG. 2, however, it shall be appreciated that many switch arrangements may be utilized without departing from the scope of the invention. Preferably, switches SW are connected to inputs 32 using a small gauge wire, such as AWG #24 wire having a cross sectional area of 0.205 $mm^2$. Switches SW are operably coupled to control circuit 10 at contact group 30. Additionally, zener diodes 33*a-d* optionally provide fault and surge protection for inputs 32*a-d* respectively, while powered or unpowered.

Comparators 34*a*, 34*b*, 34*c*, and 34*d* (collectively comparators 34) each accept an input from corresponding inputs 32 and a reference voltage 35 selectively supplied by resistors 36*a* and 36*b*. All comparator 34 inputs are electrostatically protected by zener diodes 33*a-e*. Reference voltage 35, which originates from 36*a* and 36*b*, is derived from transistor 40 and DC source 26. In the illustrated embodiment, comparators 34 are formed from a number of LM324 quad-operational-amplifiers and resistor 36*a* is a 510K resistor while resistor 36*b* is a 390K resistor holding the reference voltage 35 at 3.6 volts always provided by transistor 40. Each comparator 34 then generates an output 37, which indicates the position of the corresponding switch SW during the polling period.

During the polling period, current is selectively provided through transistors 40 and 41 of circuit 10. When a switch SW is open, it provides a logic "high" to one of the four operational amplifiers employed in the circuit 10 as voltage comparators. Illustratively, when switch SW1 is in the open state, current flows from DC source 26 through resistors 21, 23, and 118, diodes 108 and 112, and LED 114 of FIG. 2, before reaching ground. A voltage pick-off, derived from the series of resistors and LED, is the input signal to comparator 34*a*, which is greater than the reference voltage 35 present on the inverting input of the comparator. This causes output 37*a* from comparator 34*a* to be a logic "high". Alternatively, closing a switch SW will provide a logic "low" to one of the four comparators. As such, closing switch SW1 causes current to flow from DC source 26 through a resistor in series with the closed switch, an LED, and diodes to reach ground. A voltage pick-off, derived from this series of devices, is the input signal to comparator 34*a* which is less than the reference voltage 35 present on the inverting input of the comparator. This causes output 37*a* from comparator 34*a* to be a logic "low". SW2-4 have corresponding circuit components for comparable effect.

In the illustrative embodiment, the magnitude of a logic "high" received by comparator 34 may be as high as 4.2 volts, while the logic "low" may be as low as 3.0 volts. It shall be appreciated that any number of voltage combinations may be used to provide logic "high" and "low" signals in conjunction with a selected reference voltage 35. It should also be further appreciated, that the spread between the "high" and "low" thresholds may be of 4.2 volts and 3.0 volts. The circuit shown functions reliably even when there is significant resistance in the control wires, such as at a distance of one mile using AWG #24 wire.

Control circuit 10 also includes exclusive OR integrated circuit package (IC) 50, clock generator 60, logical "and" 70, one shot 80, and delay-enable 90. IC 50 includes a series of two-input EX-OR gates 52 which are configured for receiving and operating on the four input signals from contact group 30 as determined by switches SW and as logic outputs produced by comparators 34. In the illustrative embodiment, IC 50 is a CD4030CN which includes EX-OR gates 52*a*, 52*b*, 52*c*, and 52*d* (collectively 52). EX-OR gate 52*a* accepts a feedback signal 42 indicating the state of feedback relay 44 and the output 37*a* of comparator 34*a* which is controlled by switch $SW_1$, to generate its output which is then connected to the first input of EX-OR gate 52*b*. EX-OR gate 52*b* then combines the output 37*b* of comparator 34*b*, controlled by switch $SW_2$, with the output of EX-OR gate 52*a* to generate its output which is connected to the first input of EX-OR gate 52*c*. EX-OR gate 52*c* then combines the output 37*c* of comparator 34*c*, controlled by switch $SW_3$, with the output of EX-OR gate 52*b* to generate its output which is connected to the first input of EX-OR gate 52*d*. EX-OR gate 52*d* then combines the output 37*d* of comparator 34*d*, controlled by switch $SW_4$, with the output of EX-OR gate 52*c* to generate the final output 54 of IC 50. As such, the output 54 of IC 50 changes its state each time one of the inputs 32 or the feedback signal 42 changes states. Although the illustrated example of FIG. 1 only includes a four input control, it will be understood that this is not by way of limitation and that other input quantities, both larger and smaller, are envisioned.

Integrated Circuit 50 receives logic inputs 32 from switches $SW_1$, $SW_2$, $SW_3$, $SW_4$, and feedback signal 42 from feedback switch 44, each of which may assert a logic "high" or "low. The output of IC 50 is asserted "ON" or logic "high"

when the quantity of inputs which are asserted "high" are odd in number. It shall be noted that when a switch SW is closed, it will assert a "low", and when it is opened it will assert a "high". Conversely, for feedback switch 44, a "low" is asserted when switch 44 is open, and a "high" is asserted when switch 44 is closed. Illustratively, the output 54 of IC 50 is asserted "ON" when $SW_1$, $SW_2$, and $SW_3$ are open, $SW_4$ is closed, and feedback switch 44 is open. This is because switches $SW_1$, $SW_2$, and $SW_3$ provide a logic "high" when in an open state, $SW_4$ provides a logic "low" in its closed state, and feedback switch 44 provides a logic "low" in its open state. As another example, the output of IC 50 is de-asserted "OFF" when $SW_1$, $SW_2$, $SW_3$, $SW_4$, are all in the closed "low" state, and feedback switch 44 is in the open "low" state. However, it shall be appreciated upon further discussion of circuit 10 that the output 54 of IC 50 goes logic "high" (representing the "unstable" mode), in response to a single change in one of switches SW, and eventually settles to logic "low" (representing the "stable" mode), in response to the eventual state change of feedback switch 44 as indicated by feedback signal 42.

Clock generator 60 contains resistors, diodes, capacitors, and a single comparator connected to DC source 26 suitable for generating a clock signal 62. In the preferred embodiment, the clock generates a signal with a period of about 1 second having a duty cycle of 1%. Clock signal 62 in combination with a feedback signal 42 are applied to the base of transistor 41 in order to provide either intermittent power or constant power through transistor 41 to switches SW in order to allow polling and status illumination of the LEDs provided within the switches SW as will be described herein with reference to FIG. 2. The feedback signal 42, indicating the status of feedback switch 44, is also applied to the base of transistor 41 through an inverting comparator. When feedback switch 44 is closed (reflecting that load 24 is energized), it will provide a "high" signal to the inverter, which will apply a "low" signal to the base of transistor 41, causing uninterrupted current to flow to switches SW, whose internal LEDs will remain lit, thereby, indicating that the status of the load is conducting, or "ON". When the feedback switch 44 is open, providing a logic "low" (and indicating that load 24 is de-energized), the inverter supplies a "high" signal to the base of transistor 41, and only the brief periodic logic "low" of clock signal 62 will cause transistor 41 to pulse current so that the state of switches SW will be polled and that the LED's associated with the attached switches flash intermittently, thereby indicating, that the status of the load is "OFF". It shall be appreciated that other combinations of selected frequencies and duty cycles may be utilized within clock signal 62 by altering the arrangement and/or properties of the components without departing from the scope and intent of the present invention.

Logical "AND" block 70 of circuit 10 accepts the output 54 of IC 50 and clock signal 62 of clock generator 60 as its inputs to generate a state change signal 72 to "one-shot" generator 80. Logical "AND" 70 includes a comparator 74 and a plurality of resistors in order to perform a logical "AND" operation on the output 54 of IC 50 and clock signal 62. As such, the state change signal 72 will be "high" only when both the output 54 of IC 50 and clock signal 62 are both "asserted." Such arrangement of resistors and comparator 74 will be easily appreciated by one of ordinary skill.

One shot generator 80 accepts as its input the state change signal 72 generated by logical "AND" block 70. One shot 80 includes a D flip flop 82 having its D input connected to a reference voltage 43, which is a logic "high." Additionally, the clock input of D flip flop 82 is connected to the state change signal 72 while the set is connected to ground. The reset input of D flip flop 82 is connected in a notoriously old manner known in the art using a diode, resistors, and a capacitor in order for D flip flop 82 to function as a one-shot generator. In the illustrated embodiment, the components are selected such that one-shot generator 80 has a pulse duration of roughly 20 milliseconds. However, it shall be appreciated that other durations may be utilized which would also allow circuit 10 to function as desired. The data input received by D flip flop 82 is transferred to the output Q 84 (and its corresponding inverse to unused output NOT Q) during each positive-going transition of the clock input. Output Q 84 of D flip flop 82 shall be referenced as one-shot signal 84 with respect to use within circuit 10.

D flip flop 28 accepts as its clock input one shot signal 84 and receives switch status feedback signal 42 as its D input. As such, upon a rising edge, the output of D flip flop 28 is switched from either logic "low" to "high" or vice versa depending upon the previous state of feedback relay 44. Outputs Q and NOT Q of D flip flop 28 control the base of transistors 46 and 47 respectively, which are preferably NPN transistors. Transistors 46 and 47 serve to toggle the state of relay 25 which selectively provides AC power 22 to load 24. Additionally, transistors 46 and 47 control feedback relay 44 to provide feedback signal 42 to the remainder of circuit 10.

In addition to transistors 46 and 47, circuit 10 also includes transistor 48 which is controlled at the base by one-shot signal 84 which allows current to flow for 20 ms after the rising edge of each state change signal generated by one shot generator 80. As such, the delay ON-time of transistor 48 allows the state change to take place after transistor 46 or 47 settle, and allows latching relay 25 to remain de-energized except during the periods required to switch state.

As an additional feature, in order to protect against anomalies derived from power failure, circuit 10 includes delay enable 90 which operates as a collection of resistors, capacitors, transistors, and one comparator to control transistor 27 such that the state of relay 25 may only be modified by the remainder of circuit 10 after an initial enabling period following a loss of power at DC source 26. In the illustrated embodiment, the components are selected to provide a ½ second delay enable, but other durations may be provided for.

A reference voltage is set on the second of operational amplifier 92 and a charging capacitor 94 is tied to the first input of amplifier 92. After some delay, the capacitor 94 will charge to a voltage exceeding the reference voltage of the second input, which will cause the amplifier 92 to turn on transistor 27, thus allowing the relay to switch states, if so directed, by the remaining circuitry of circuit 10. Under normal operation, transistor 96 is not conducting because the current arriving from resistor 95 is shunted to ground by transistor 97, which is normally conducting. When a power interrupt occurs, transistor 97 is no longer biased to conduct, thus permitting capacitor 98 to discharge through the base-emitter of transistor 96. Diode 99 assures that the only conductive path for the discharge of the capacitor 98 is through the base emitter of transistor 96. With transistor 96 conducting, the capacitor 94 will be fully discharged almost instantaneously. When power is re-applied to the circuit, transistor 97 is instantly conducting, which in turn, clamps transistor 96 off. This action permits capacitor 94 to commence charging and to reach a voltage exceeding the reference voltage applied to the second input of amplifier 92, which permits transistor 27 to conduct.

Figure 2:
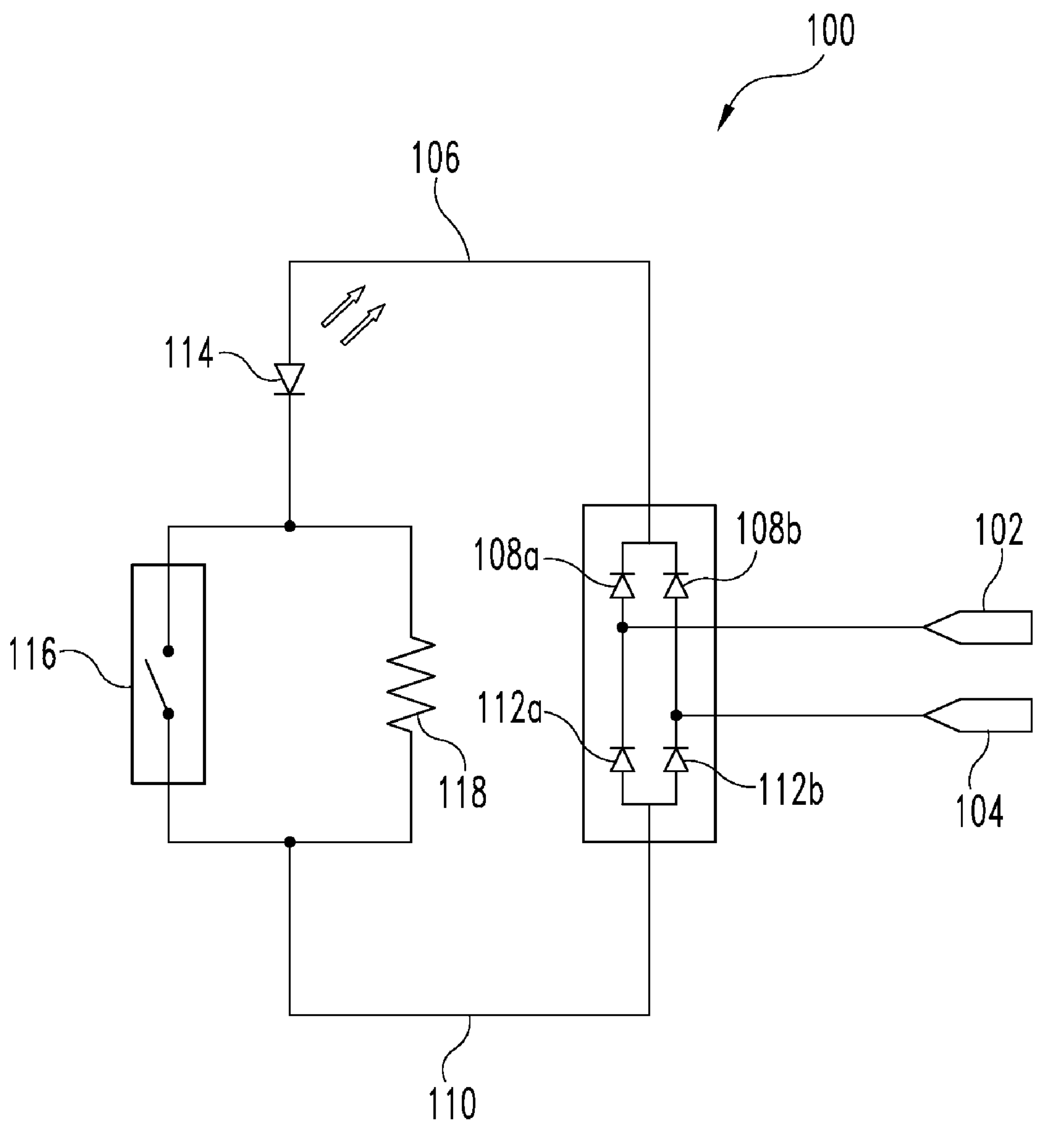
FIG. 2 is a schematic diagram of one embodiment of an input switch suitable for connection and operation with an input of the control circuit of FIG. 1 to provide remote load control and status indication.

Turning to the detail of switches SW, FIG. 2 shows a schematic of an input switch suitable for single wire connection to and operation with an input 30 of the control circuit of FIG. 1. When coupled with an input of the control circuit of FIG. 1, the illustrated switch provides remote load control and a visible load status indication. Switch control 100 includes two input connections 102 and 104. Input connections 102 and 104 are then each connected to a DC source line 106 through one of a pair of diodes 108*a* and 108*b* respectively. Additionally, input connection 102 and 104 are also connected to a ground line 110 through one of a reversed pair of diodes 112*a* and 112*b*. Therefore, during installation, regardless of which electrical line is connected to either of connections 102 and 104 the switch control 100 will function properly and not be damaged. A light emitting diode (LED) 114 is connected to DC source line 106. A switch 116, which is preferably a single pole switch, is connected in parallel with a resistor 118. Alternative switch types may be utilized depending upon cost and user preference without departing from the scope of the present invention. The combination of switch 116 and resistor 118 are effectively connected between LED 114 and a ground provided by ground line 110. When the switch 116 is closed, the signal carried by DC source line 102 to input 30 is a logical "low." Alternatively, a logical "high" is carried when switch 116 is open. Either way, whenever the load as controlled by control circuit 10 is on, the clock generator 60 pulses the clock signal 62 (such as every 1 second, @ a 1% duty cycle) to allow transistor 40 to flow DC current so that LED 114 is illuminated. Therefore, when the load is on, LED 114 appears lit constantly, while when the load remains off, LED 114 flashes intermittently. The flashes may serve as a load status indicator, night light, or switch location indicator, such as in a dark room when the load is off.

In an alternate embodiment, switch control 100 is connected to control circuit 10 via a single wire connected to input 102 and the other connection 104 to switch control 100 is connected to a common ground.

Figure 3:
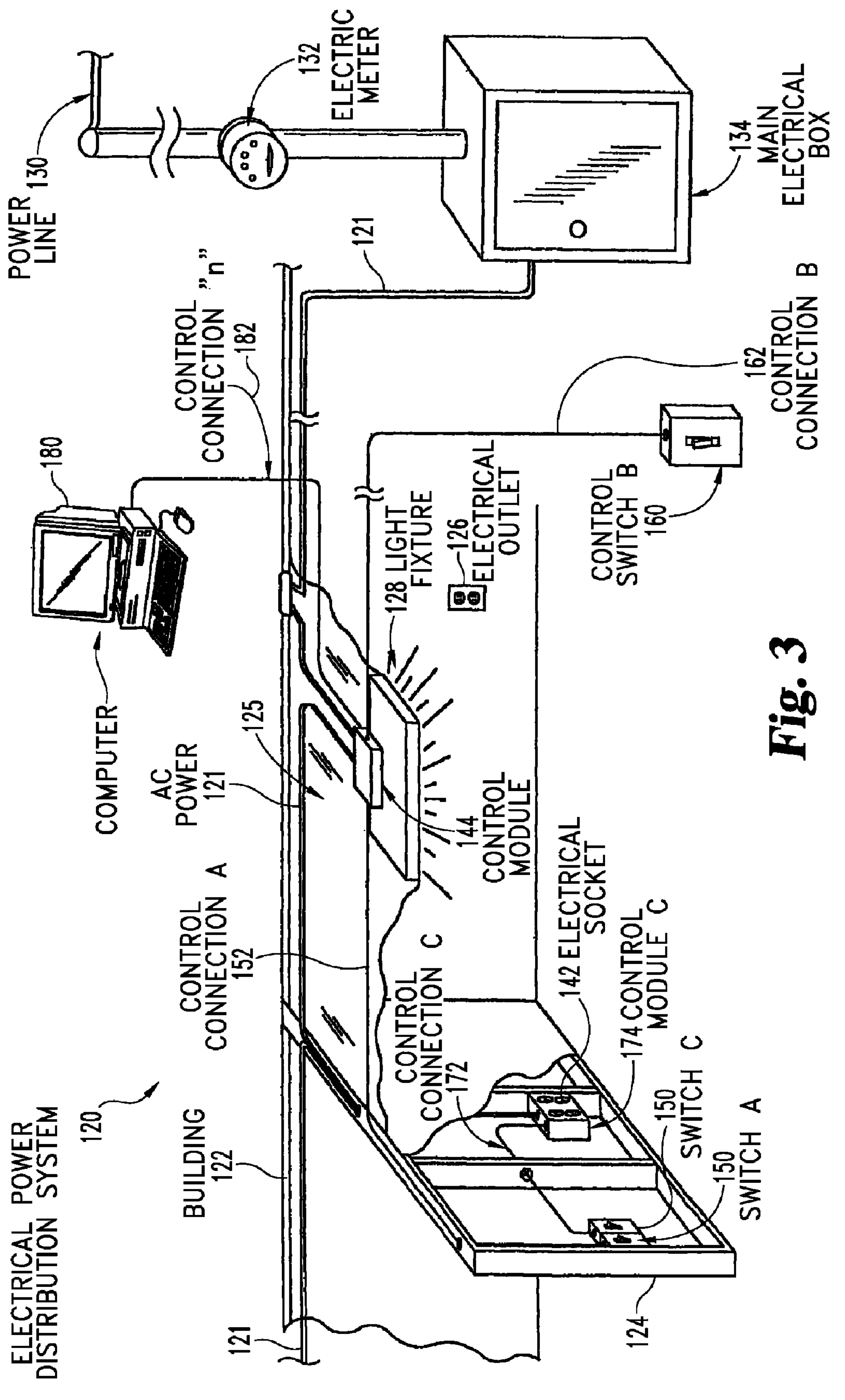
FIG. 3 shows a first embodiment of an electrical power distribution system for efficiently installing electrical lights, devices, and power outlets in a structure, such as a residential building.

FIG. 3 shows one simple embodiment of an electrical power distribution system 120 for efficiently installing electrical lights, devices, and power outlets in a structure utilizing control circuit 10 of FIG. 1. Illustratively, a non-exhaustive list of example structures includes, but is not limited to, a building, a home, an apartment, an office building, an apartment complex, or garage. These structures include various structural members including, for example, floors, walls, ceilings, stairs, and doorways. As shown, AC power 121 is distributed throughout building 120. AC power 121 is routed within walls 124 and ceiling 125 to various electrical devices including electrical wall socket 126 and lighting fixture 128. Power line 130 connects through electric meter 132 to main electrical box 134 of building 120. AC power 121 is routed from main electrical box 134 to electrical outlet 126, light fixture 128, and electrical socket 142. Preferably, AC power 121 provides 120V at 60 Hertz.

Control module 144, which implements control circuit 10 of FIG. 1, is preferably ceiling or wall mounted and operably couples to AC power 121 and provides a controlled output to light fixture 128 as described in FIG. 1. Wall mounted switch A 150 operably couples to control module 144 through control connection A 152. In addition, control switch B 160 also couples to control module 144 through control connection B 162. In at least one mode of operation, switch A 150 and switch B 160 govern the operation of light fixture 128 by selectively commanding control module 144 to energize the controlled output operably coupled to light fixture 128. Similarly, control module C 174 selectively energizes electrical socket 142. Switch C 170 operably couples to control module C 174 through control connection C 172. Control module C 174 selectively energizes electrical socket 142 dependent upon the state of switch C 150.

In addition, electrical power distribution system 120 is adapted for home automation. Illustratively, computer 180 operably couples to control module 144 by control connection "n" 182 to selectively control the operation of control module 144. This allows a user to control light fixture 128 using a home automation program running on the computer or similar computing device. In addition, a user may remotely control the electrical power distribution system 120 through a network device or computer operably coupled to the various control modules within the system. Illustratively, computer 180 may be operably coupled to the a network, such as the Internet or a building wide intranet. A remote user interface of may then control the operation of electrical power distribution system 120 by submitting commands via the network to computer 180.

In some embodiments, the control inputs to a control module are less than about 120V. In still other embodiments, the control inputs are less than about 12 volts. In yet other embodiments, the control inputs are less than 5V. In still other embodiments, the control inputs signals are compatible or interoperate with the various standard logic gate input voltages and currents. Illustratively, a partial list of example logic families includes but is not limited to standard CMOS, TTL, BiCMOS, and ECL. Other example logic families having a variety of low voltage and or low current signaling requirements include LS, ALS, ABT, ACT, ACTQ, ACQ, FAST, MG, HC, FACT, LVC, LCX, 10H ECL, 100K ECL, ECL in PS or E-Lite ECL. For example, is some embodiments a control signal having a voltage of about 5 V at a current of 1 mA would be suitable.

In one embodiment, the first end of switch A 150 is coupled to an input of control module 144 and the second end of switch 150 is coupled to a ground reference relative to a DC power supply for control module 144 inputs. The input of control module 144 provides a resistive pull-up to a DC power supply that is coupled, for example, to the non-inverting input of amplifier 34 of FIG. 1. As a result, closing switch A 150 provides the input of control module 144 with a threshold "low" indication. Opening switch A 150 provides the input of control module 144 with a threshold "high" input.

Because the inputs to control module 144 are low power inputs, small wires may be used to install controls for electrical power distribution system 120. Illustratively, control connection A 152 may include wire having a gauge preferably AWG #16 wire or smaller. For example, in some embodiments control connection A 152 is AWG #20 wire. Yet, in other embodiments it is most preferable to have an AWG #24 wire, to provide a control connection between a switch element and a control module. The control connection may comprise solid or stranded wire, flat or round, or other shaped wire having comparable gauge wires. The use of low voltage and low current permits smaller gauge wire to provide control connection to the control modules, which allows for significantly simpler, lower cost, and less labor intensive methods of installation. This is particularly advantageous to installers of ceiling light fixtures and ceiling fans.

Although the control modules shown in FIG. 3 are installed within the structural members of the building, some embodiments of the control modules are installed by plugging them into an existing electrical socket or outlet, for example, a wall socket or light socket. Alternatively, other embodiments are adapted for installation or retrofit into an existing light socket. Illustratively, some embodiments of the control module further includes a connector plug (not shown) compatible with a wall socket. Still other embodiments of the control module further include a screw base (not shown) compatible for mating with a light fixture. A centrally located lighting control box utilized in building structures is also envisioned wherein a multitude of circuits 10 all would share a single power supply.

Figure 4:
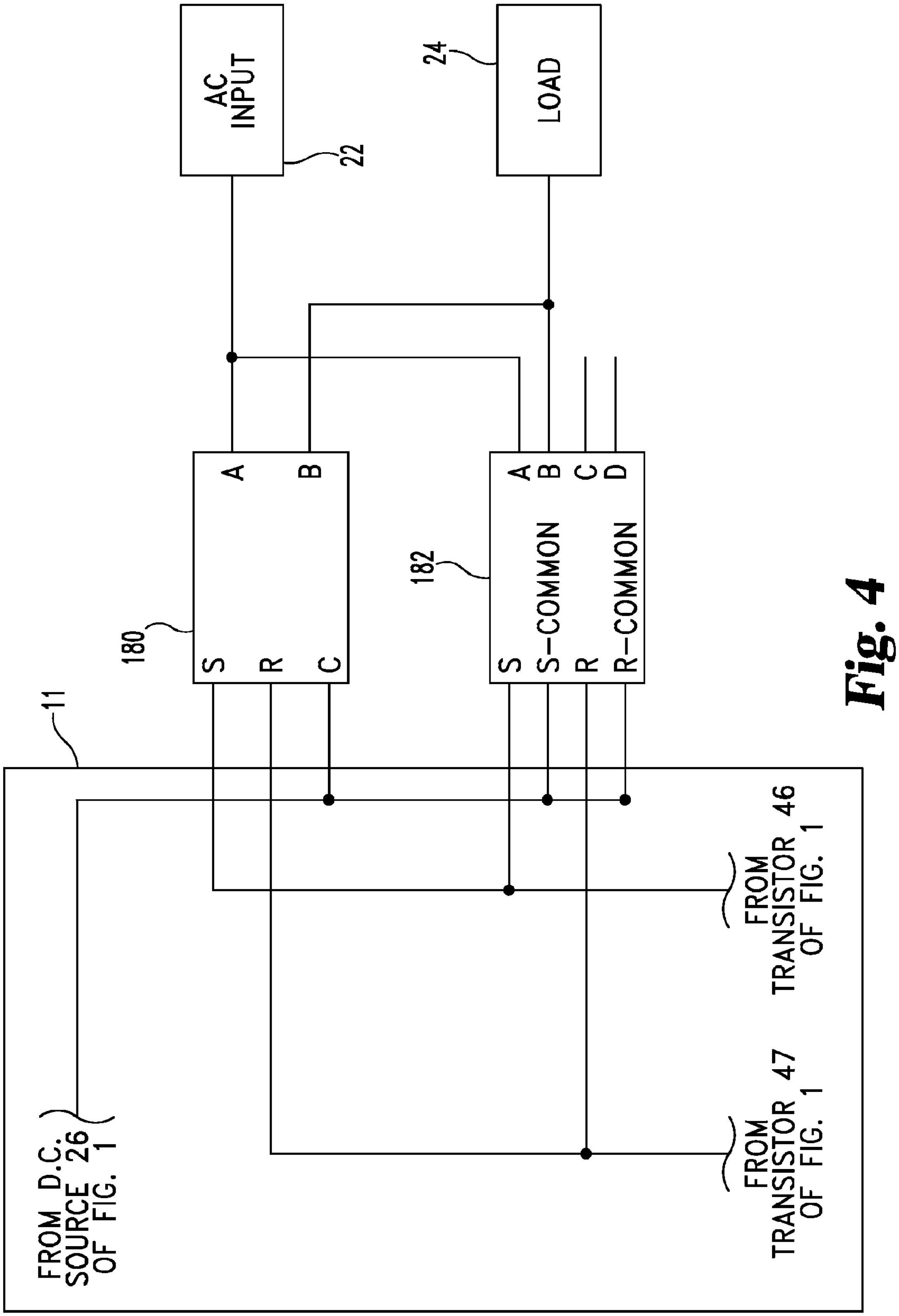
FIG. 4 is a schematic diagram of an alternate embodiment of a low voltage AC control circuit.

FIG. 4, with continued reference to FIG. 1, also shows an alternate embodiment of the control circuit 10 of FIG. 1, wherein a solid state relay 180 is provided in parallel connection with a relay 182. It shall be appreciated that solid state relay 180 and relay 182 may be utilized with control circuit portion 11 of FIG. 1. Solid state relay (SSR) 180 may be a photo-coupled SSR, transformer-coupled SSR, or a hybrid SSR. Additionally, relay 182 may be a latching relay, such as a mechanically latching relay. Further, relay 182 may be a latching relay comprising a ratchet and pawl. In one form, the SSR 180 is activated in response to signal from D flip flop 28 provided through transistor 46. Alternatively, SSR 180 is deactivated in response to a signal from D flip flop 28 provided through transistor 47. Preferably, a signal from D flip flop 28 arrives at SSR 180 so that it activates prior to the closing of the contacts of relay 182 when energizing the load. Additionally, a signal from D flip flop 28 preferably reaches SSR 180 so that it deactivates after the opening of the contacts of relay 182 when de-energizing the load. In order to ensure this proper sequence, signal delay components may be included in series with the signals created by D flip flop 28 before reaching relays 180 and 182. Preferably, a time delay circuit delays the signal which closes relay 182, allowing plenty of time for SSR 180 to close first. Additionally, another time delay circuit delays the signal which opens SSR 180 allowing the relay 182 to have plenty of time to open first. In a further form, SSR 180 is disabled shortly after the closing of the contacts of relay 182 and enabled only slightly before the opening of the contacts of relay 182 in order to prevent heat problems created by its operation.

Figure 5:
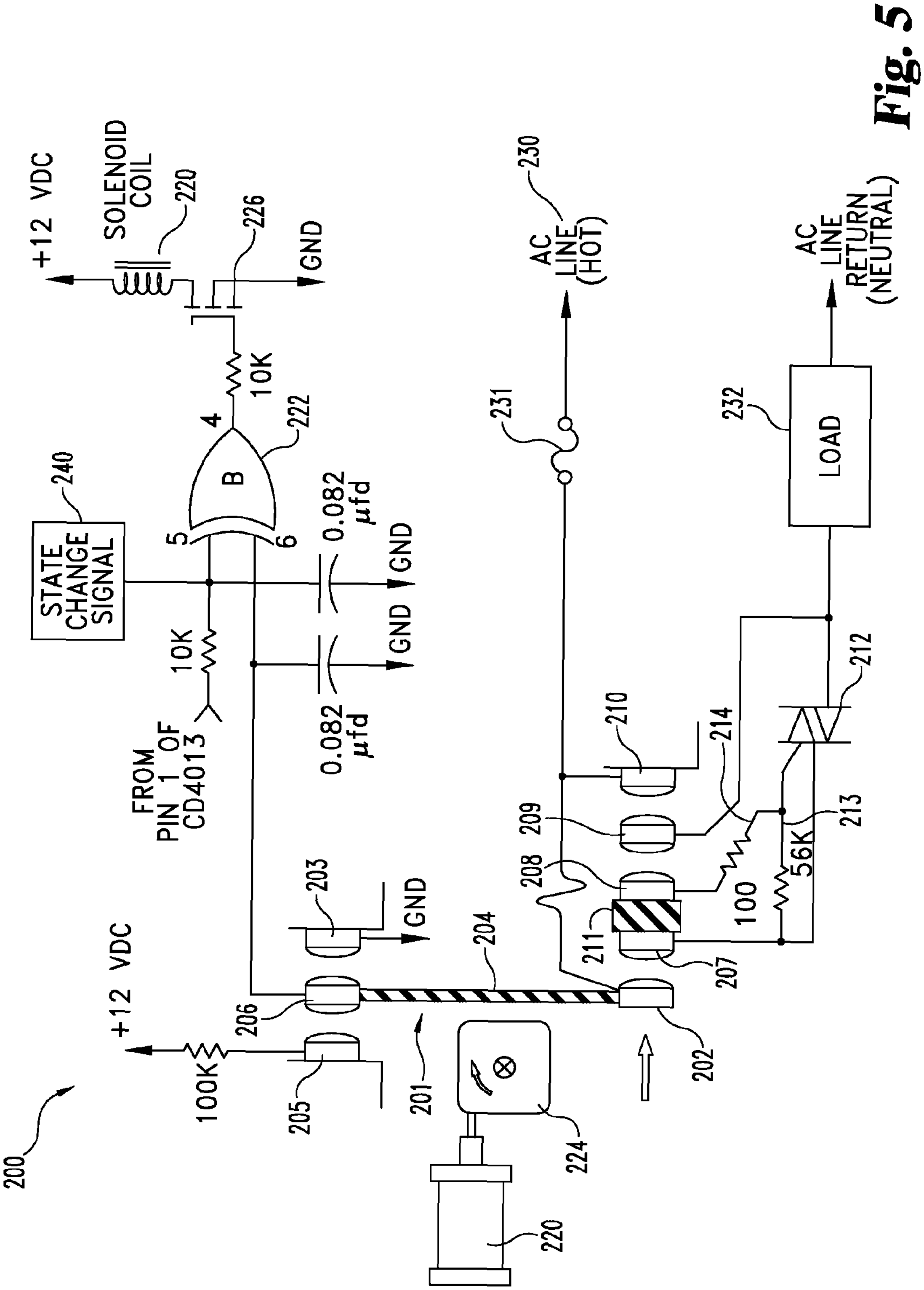
FIG. 5 is a schematic diagram of a sequential combination hybrid relay suitable for use with a control circuit, such as the one provided in FIG. 1.

FIG. 5 shows a sequential relay combination suitable for use with any control circuit, such as the one disclosed in FIG. 1 or otherwise known to one of skill in the art. Sequential relay 200 includes an AC contact 202 which is suitable for connection to an AC Line 230 via breaker 231. AC contact 202 is mounted to an insulating material 204 which is also connected to a feedback contact 206. Collectively, AC contact 202, insulating material 204, and feedback contact 206 make-up a movable member 201 which is actuated by ratcheting cam 224 which is driven by solenoid coil 220. Upon proper signal, solenoid 220 rotates ratcheting cam 224 through 45 degrees which moves the movable member 201 from a first position to a second position and vice versa depending upon the initial position of the cam 224 and the member 201. Preferably, the cam 224 is square shaped having rounded corners for smoother transistioning operation. It shall be appreciate that other implementation may include other devices for mechanical state advancement and state-keeping.

For purposes of illustration, the operation of sequential relay 200 will now be described with reference to movement from its first position to its second position and vice versa. At its first position (considered to be its left-most position in FIG. 5) AC contact 202 is not connected with any other contact. Additionally, feedback contact 206 is connected to contact 205 which is tied to a logic "HIGH." In this position, feedback contact 206 provides a logic "HIGH" to the second input of exclusive OR gate 222. The first input of exclusive OR gate 222 is connected to a state change signal 240 that may be provided by an control circuit known to one of skill in the art and adapted for use herein.

In the illustrated embodiment, when state change signal 240 is held "LOW", the output of exclusive OR 222 is "HIGH" which allows current to flow through the N-channel MOSFET 226, thereby energizing solenoid coil 220 to effectuate a 45 degree rotation of cam 224. Alternatively, when state change signal 240 is "HIGH", the output of exclusive OR 222 is "LOW" which does not allow current to flow through MOSFET 226.

In the event of a "HIGH" state of state change signal 240, the rotation of cam 224 drives movable member 201 from left to right. From its left-most position, driven by cam 224, AC contact 202 first connects with SSR contact 207 applying a voltage to the first input of SSR 212. However, SSR 212 does not yet provide AC current to the load 232 due to control signal 213 provided to the gate of SSR 212 by a resistor 214. In the illustrative embodiment, the 56K resistor 213 maintains a zero gate voltage. Since current is not flowing to the load when contact is made with the SSR 212, arcing will not occur between the contacts.

As member 201 continues to move, gate control contact 208, which is mounted to SSR contact 207 while remaining isolated by a insulating material 211, comes into connection with contact 209 and energizes control signal 214, by way of a 100 ohm resistor, which, when applied to the gate of SSR 212, causes SSR 212 to provide AC current to the load 232. Finally power contact 210 is connected and SSR 212 is electrically shunted across its two main terminals, which prevents heat generation while power contact 210 directly provides AC power from line 230 to load 232, via contact 209. It shall be appreciated that the voltage drop between contact 209 and power contact 210 is low due to the conductive state of SSR 212, which, thereby keeps arcing to a minimum and accordingly, enhances the contact life of the relay. Upon completion of the movement of member 201, feedback contact 206 shifts from one contact providing a logic "HIGH" to a second contact providing logic "LOW," thus deactivating solenoid coil 220.

Conversely, the operation of sequential relay 200 will now be described with reference to movement from its second position to its first position. At its second position (considered to be its right-most position in FIG. 5) contacts 202 and 207 are in electrical connection as well as contacts 208, 209, and 210 which are also in electrical connection. Additionally, feedback contact 206 is connected to contact 203 which is tied to a ground. In this position, feedback contact 206 provides a logic "LOW" to the second input of exclusive OR gate 222. In the event of a "LOW" state of state change signal 240, the rotation of cam 224 drives movable member 201 from right to left. As the member 201 moves, power contact 210 releases contact with contact 209 which enables the SSR 212 and breaks the flow of AC current from contact 210 to contact 209. As discussed herein, the low voltage drop between contact 209 and 210 minimizes arcing. Then, control contact 208 pulls away from contact 209 disabling the SSR. Next, AC contact 202 pulls away from SSR contact 207 removing AC power from the SSR without arcing. The contact break of 202 away from contact 207 assures that no high voltage leakage current can be present at the load. Upon completion of the movement of member 201, feedback contact 206 shifts from logic "LOW" to logic "HIGH," thus deactivating solenoid coil 220.

Certain embodiments of the disclosed circuit allow the use of a single control conductor for both the AC load control and for load status indication. All that is additionally needed is a ground conductor which may be common to all of the circuit 10 switches employed in a particular installation. Because of the circuit design, very small conductors may be used, such as AWG #24 or less, operating at low voltage, thus not only lowering the installation and wire costs, but also avoiding the need for conduit or even thick electrical insulation, or holes drilled in the wall studs. This makes possible the retrofitting of older house wiring in cosmetically pleasing ways that are easier to install, and vastly simplifies and reduces cost in new home construction as well, particularly where many loads are being switched from multiple locations.

While the invention has been illustrated and described in detail in the drawings and foregoing descriptions, the same is to be considered as illustrative and not restrictive in character, it being understood that only the preferred embodiment has been shown and described and that all changes and modifications that come within the spirit of the invention are desired to be protected.

What is claimed:

1. An electrical load control circuit using low voltage for remotely selectively energizing or de-energizing an electrical load comprising:

a series of several inputs suitable for low current connections to remote switches;

a conceptual exclusive OR circuit for producing a first DC control signal in said conceptual exclusive OR circuit one output state and a second DC control signal in said conceptual exclusive OR circuit second output state in response to the states of the several inputs, such that the change in stage of any one of said series of inputs will change the state of said conceptual exclusive OR circuit output;

a latching relay adapted for switching AC power applied to an electrical load from an AC supply source controlled by the output of said conceptual exclusive OR circuit which relay is energized to change states but is otherwise not generally energized to maintain a given state; and an output controlled by said relay for connection to a lead to an electrical load and a lead to an AC supply.

2. The load control circuit of claim 1 in which at least one of said series of inputs in suitable for connection to a wire having a cross-sectional area less than 784 square mils.

3. The load control circuit of claim 1 in which each of said series of inputs is of a type selected from the group consisting of: a socket connector suitable for receiving a plug, a crimp-on terminal, or an insulation displacement connector.

4. The load control circuit of claim 1 in which said latching relay operates electro-mechanically.

5. The load control circuit of claim 4 in which said latching relay comprises a ratchet and pawl.

6. The load control circuit of claim 1 in which said AC supply is about 120 volts at 60 Hertz.

7. The load control circuit of claim 1 in which said series of inputs includes at least three inputs.

8. The load control circuit of claim 7 in which said series of inputs includes at least five inputs.

9. The load control circuit of claim 7 in which at least one of said series of inputs is connected to a manually operable switch.

10. The load control circuit of claim 9 in which at least one of said series of inputs is connected to a single pole switch.

11. The load control circuit of claim 10 in which each of said series of inputs is connected to a single pole switch.

12. The load control circuit of claim 9 in which said switch is wall mounted.

13. An electrical load control circuit using low voltage for remotely selectively energizing or de-energizing an electrical load comprising:

a series of several inputs suitable for low current connections to remote switches;

a conceptual exclusive OR circuit for producing a first DC control signal in said conceptual exclusive OR circuit one output state and a second DC control signal in said conceptual exclusive OR circuit second output state in response to the states of the several inputs, such that the change in state of any one of said series of inputs will change the state of said conceptual exclusive OR circuit output;

a relay adapted for switching AC power applied to an electrical load from an AC supply source controlled by the output of said conceptual exclusive OR circuit, wherein said latching relay is energized to change states but is otherwise not generally energized to maintain a given state;

a hybrid solid state relay having an output connected in parallel with the output of said relay and a control input which activates said solid state relay before the contacts of said latching relay open or close in response to a change in state of said conceptual exclusive OR circuit; and a load output controlled by said relays for connection to a lead to an electrical load and a lead to an AC supply.

14. The load control circuit of claim 13 in which said solid state relay is a triac.

15. The load control circuit of claim 13 in which said solid state relay is a thrysistor.

16. The load control circuit of claim 13 in which said relay is a latching relay.

17. The load control circuit of claim 16 in which said latching relay comprises a ratchet and pawl.

18. The load control circuit of claim 13 in which each of said series of inputs is of a type selected from the group consisting of: a socket connector suitable for receiving a plug, a crimp-on terminal, or an insulation displacement connector.

19. The load control circuit of claim 18 in which said series of inputs includes at least five inputs.

20. The load control circuit of claim 19 in which at least two of said series of inputs are connected to a wall mounted single pole switch.

* * * * *

UNITED STATES PATENT AND TRADEMARK OFFICE

CERTIFICATE OF CORRECTION

PATENT NO. : 8,102,130 B2
APPLICATION NO. : 12/143190
DATED : January 24, 2012
INVENTOR(S) : James N. Seib et al.

It is certified that error appears in the above-identified patent and that said Letters Patent is hereby corrected as shown below:

ON THE TITLE PAGE: ITEM 75 SHOULD READ

James N. Seib, Bedford, IN (US); Kevin Broc Seib, Lafayette, IN (US)

Signed and Sealed this
Tenth Day of March, 2015

Michelle K. Lee
*Deputy Director of the United States Patent and Trademark Office*